Figure 1:
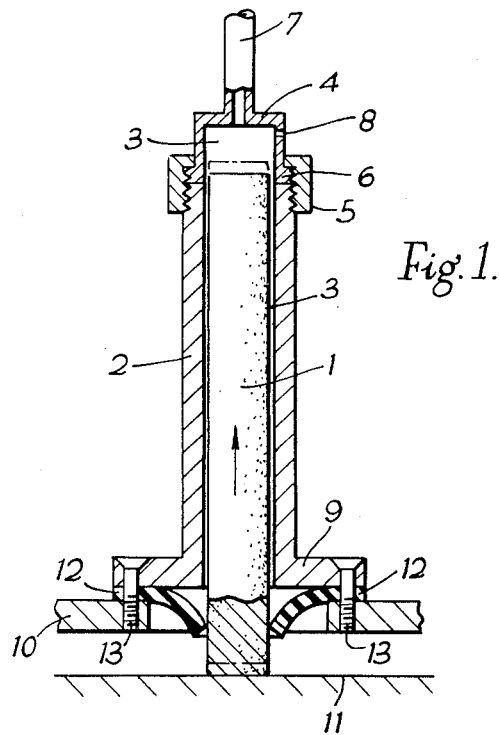

Aug. 28, 1962  D. D. THEOBALD  3,051,956
MARKING APPARATUS

Filed Aug. 22, 1960  2 Sheets-Sheet 1

INVENTOR
D.D. THEOBALD
BY Morse J Hall
ATTORNEYS

United States Patent Office 3,051,956
Patented Aug. 28, 1962

3,051,956
MARKING APPARATUS
Donald David Theobald, Kelvin Works, Kelvin Ave.,
Hillington, Glasgow, Scotland
Filed Aug. 22, 1960, Ser. No. 51,036
Claims priority, application Great Britain Aug. 24, 1959
8 Claims. (Cl. 346—141)

The present invention relates to marking apparatus and one of its objects is to provide a marking device suitable for use with ultrasonic testing equipment to mark the surface of a body in response to a signal from the testing equipment indicating the presence of a fault in the body.

In what follows the term "crayon" will be used to mean any writing or marking medium in the form of a consumable stick or rod and to include, in particular, crayons, chalks, and pastels.

In accordance with the invention a crayon holder for a marking device comprises a body with an elongated cavity therein, an inlet leading into one end of the cavity and adapted for the attachment of a gas conduit to supply gas under pressure to the inlet end of the cavity, and at least one flexible elastic retaining member so arranged about an opening at the other end of the cavity that when a crayon is placed in the cavity and projects through the opening it will be gripped by the retaining member in such a manner as to enable an increase of gas pressure within the cavity to force the crayon to move further out of the cavity against the restoring force set up by flexure of the retaining member.

Thus the application of gas pressure to the inlet end of the cavity in response to the receipt of a fault signal presses the crayon into a position where it can effect marking of the body under test, and on release of the gas pressure the elasticity of the retaining member or members effects retraction of the crayon to terminate marking.

Also in accordance with the invention a marking device comprises such a crayon holder with a crayon contained in the elongated cavity and having one end projecting out of the cavity through the opening, the edges of the retaining member surrounding the opening being deflected by the crayon and in frictional engagement with the surface thereof in such a manner that the crayon tends to be retained in the cavity.

Further in accordance with the invention ultrasonic testing apparatus comprises a crayon holder or marking device in accordance with the invention, a source of gas under pressure connected to the inlet thereof, ultrasonic flaw detection equipment adapted to provide output flaw signals indicating the presence of flaws in a body under test, an electromagnetically-operated valve connected for operation by the flaw signals and arranged to cause an increase of gas pressure in the inlet end of the cavity so as to force the crayon into contact with the surface of the body when a flaw signal is present, and in the absence of a flaw signal to allow the pressure to fall, thereby permitting the crayon to be retracted by the retaining member.

Figure 2:
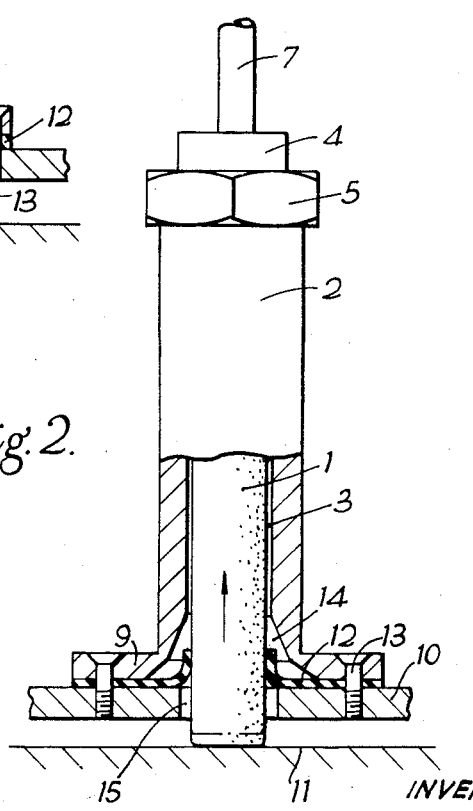
Figure 3:
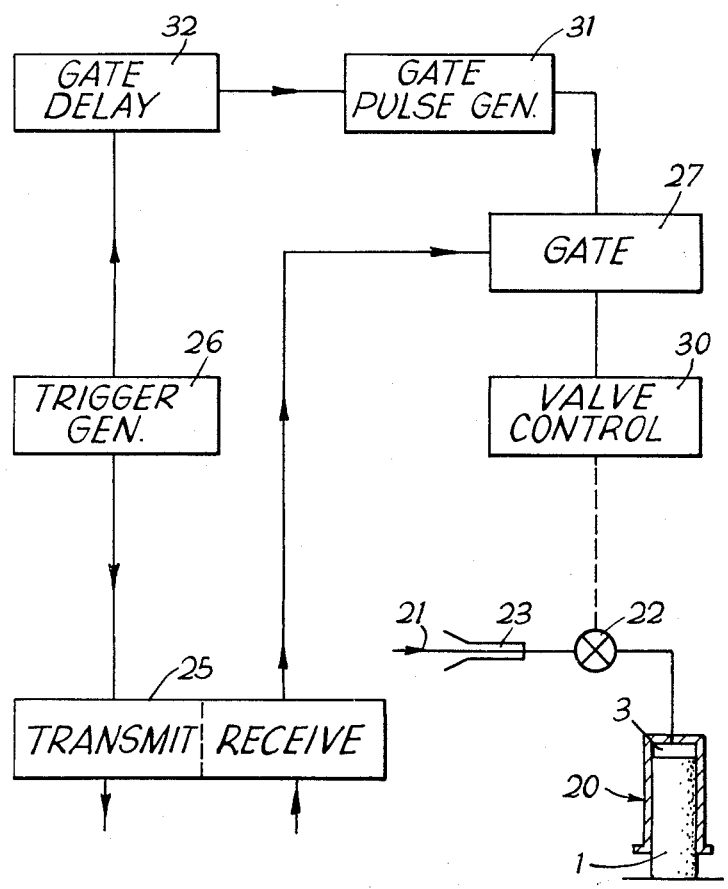

Specific embodiments of the invention will now be described by way of example with reference to the accompanying drawings, in which:

FIG. 1 is a section of one form of marking device in accordance with the invention, FIG. 2 is a section of an alternative form of marking device, and FIG. 3 is a block circuit diagram of ultrasonic testing apparatus embodying the invention.

Referring now to FIG. 1, the marking device shown comprises a crayon holder containing a cylindrical crayon 1. The holder has a tubular body 2 with an internal cavity 3 of a diameter somewhat larger than that of the crayon 1. The upper end of the cavity 3 is closed by a cap 4 fastened to the body 2 by means of a nut 5 gripping a flange 6 on the cap. The cap 4 has an inlet pipe 7 at its centre which is provided with a union (not shown) for coupling it to piping supplying air under pressure. The cap 4 has a small bleed hole 8 at one side through which air can leak away from the cavity 3. The bottom of the tubular body 2 is encircled by a wide flange 9 by means of which the body 2 is attached to a mounting plate 10 supporting it above the surface 11 of the body under test. A synthetic rubber diaphragm 12 is clamped between the flange 9 and the mounting plate 10 by screws 13 and extends over the end of the cavity 3 in the tubular body 2, having a circular aperture in register with the end of the cavity 3 and of smaller diameter than the crayon 1.

The crayon 1 is introduced into the holder by removing the cap 4 and pushing the crayon down into the body 2 and through the aperture in the diaphragm 12. The cap 4 is then replaced and when air pressure is applied at the inlet end of the cavity 3 the crayon is forced down into contact with the surface 11 to be marked. The diaphragm 12, already bent by the insertion of the crayon 1 into a hole too small for it, is further bent by the pressing down of the crayon and this bending is assisted by the pressure communicated through the air lying between the crayon and the walls of the cavity. When the air pressure is released the tension in the diaphragm is relaxed and it returns to its initial, slightly bent, condition and withdraws the crayon from the surface in the direction of the arrow, the crayon resuming the position shown in broken lines in the figure.

In the alternative construction shown in FIG. 2 the crayon is introduced into the cavity through the opening in the diaphragm at the lower end of the cavity. The construction of the upper part of the holder is similar to that of FIG. 1 and the same reference numerals are used for corresponding parts in the two figures. The lower end of the cavity 3 in the tubular body 2 is enlarged at 14 to accommodate inward flexure of the diaphragm 12 on insertion of the crayon. As before the diaphragm 12 is clamped between the flange 9 and the mounting plate 10 by screws 13 and has a circular opening of a diameter less than that of the crayon 1 in register with the cavity 3. The mounting plate 10 in this embodiment extends under the diaphragm 12 to provide support for it and has an aperture 15 through which the crayon 1 passes freely.

As already stated the crayon 1 is introduced into the cavity 3 through the diaphragm 12 and the edges of the diaphragm in contact with the surface of the crayon flex upwardly. When air pressure is applied to the upper end of the cavity the crayon is forced down into the position shown in the drawing, in contact with the surface 11 to be marked. The diaphragm suffers further flexure and compression against the support provided by the mounting plate 10 and exerts a restoring force in the direction of the arrow tending to retract the crayon to the position indicated by broken lines.

While the marking device of FIG. 2 is shown as having the same cap 4 and inlet pipe 7 secured by a nut 5 as that of FIG. 1 it will be apparent that since the crayon is introduced from the lower end of the body 2 the upper end may be permanently closed except for the provision of an air inlet.

The use of a diaphragm permits the crayon to be fed out of the cavity to the extent necessary to make contact with the surface of the body and to accommodate wearing of the crayon while ensuring that the crayon is always retracted from the surface when the air pressure is released. It will be apparent that if leakage of air down the sides of the crayon is kept small the single diaphragm with a hole matching the cross-section of the crayon may be replaced by two or more separate flanges which will close round an inserted crayon in such a way as to provide the required restoring force.

Referring now to FIG. 3, the supply of air to the marking device 20 from a compressed-air line 21 is controlled by a solenoid-operated air valve 22 which when the solenoid is energised connects the inlet of the marking device to the air line and when it is de-energised allows the cavity 3 of the marking device 10 to exhaust to atmosphere. The pressure built up behind the crayon 1 is controlled to a small extent by the bleed hole 8 in the cap 4 of the marking device. More satisfactory control can be effected by means of a flow regualtor 23 in the air line 21 immediately before the air valve 22.

The energisation of the solenoid of the air valve 22 is effected by the output from a conventional ultrasonic flaw detecting equipment giving output signals representing flaws in the body under test. This equipment includes transmitting and receiving apparatus 25 of known form for transmitting pulses of ultrasonic wave energy into the medium to be explored and receiving from the medium the wave energy resulting from reflection and refraction of the transmitted pulses at the boundaries of the medium and at flaws or discontinuities in the medium. The apparatus 25 may include a single transmitting and receiving transducer for conversion between electrical and ultrasonic impulses, an oscillator connected to the transducer through a gate for the transmission of short bursts or pulses of waves, and a detector circuit for converting the vibrations of the transducer in response to received ultrasonic waves into electrical signals.

The transmitting section of the apparatus 25 operates under the control of triggering signals derived from a trigger generator 26. The resulting signals received by the receiving section of the apparatus 25 are applied to a gating circuit 27. The gating circuit 27 is opened for a time corresponding to reception of echo signals from a particular stratum of the medium under test by gating pulses derived from a gate pulse generator 31 triggered through a delay circuit 32 by the triggering pulses from the trigger generator 26 which initiate the transmission of ultrasonic pulses into the medium. While open it transmits flaw echo signals to a valve control circuit 30 incorporating the solenoid of the air valve 22, which is thereby actuated by all echo signals whose amplitude exceeds a pre-set level.

A number of separate marking devices may be used in conjunction with a single ultrasonic transmitting and receiving apparatus, each being controlled by echo signals from different parts of the medium selected by gates with different delays and different times of opening.

The marking device and the ultrasonic transducer are carried on a common mounting and moved relative to the body under test in such a way that the transducer is leading. The delay between detection of a fault and commencement of marking is preferably so adjusted as to compensate for the spacing between the transducer and the marking crayon in such a way that the surface of the body is marked immediately over the location of the fault.

While there have been described above what are presently believed to be the preferred forms of the invention, variations thereof will be obvious to those skilled in the art and all such changes and variations which fall within the spirit of the invention are intended to be covered by the generic terms in the appended claims, which are variably worded to that end.

I claim:

1. A crayon holder for a marking device comprising a body with an elongated cavity therein, an inlet leading into one end of the cavity and adapted for the attachment of a gas conduit to supply gas under pressure to the inlet end of the cavity, and at least one flexible elastic retaining member so arranged about an opening at the other end of the cavity that when a crayon is placed in the cavity and projects through the opening it will be gripped by the retaining member in such a manner as to enable an increase of gas pressure within the cavity to force the crayon to move further out of the cavity against the restoring force set up by flexure of the retaining member.

2. A crayon holder as claimed in claim 1 in which the retaining member is a diaphragm covering the end of the cavity and the opening is an opening in the diaphragm of smaller dimensions than the cross-section of the cavity.

3. A crayon holder as claimed in claim 2 in which the inlet end of the cavity is provided with a removable cap for the insertion of the crayon.

4. A crayon holder as claimed in claim 2 in which the said other end of the cavity is enlarged to accommodate inward flexure of the diaphragm and an outer plate is mounted over the diaphragm having an aperture in register with and of larger dimensions than the opening of the diaphragm.

5. A crayon holder as claimed in claim 1, wherein said body is formed with a bleed hole communicating with the inlet end of said cavity.

6. A crayon holder as claimed in claim 3, in which said inlet is formed in said cap, said cap also having a bleed hole therethrough.

7. A marking device comprising a crayon holder in accordance with claim 1, with a crayon contained in the elongated cavity and having one end projecting out of the cavity through the opening, the edges of the retaining member surrounding the opening before being deflected by the crayon and in frictional engagement with the surface thereof in such a manner that the crayon tends to be retained in the cavity.

8. A marking device comprising a crayon holder in accordance with claim 3, with a crayon contained in the elongated cavity and having one end projecting out of the cavity through the opening, the edges of the diaphragm surrounding the opening being deflected outwards, away from the cavity, by the crayon and in frictional engagement with the surface thereof whereby to apply an inward restoring force on the crayon.

References Cited in the file of this patent

UNITED STATES PATENTS 2,282,929    Billstein _____ May 12, 1942

FOREIGN PATENTS 736,464    Great Britain _____ Sept. 7, 1955